United States Patent [19]

Young

[11] Patent Number: 5,151,789
[45] Date of Patent: Sep. 29, 1992

[54] SYSTEM AND METHOD FOR AUTOMATIC, UNATTENDED RECORDING OF CABLE TELEVISION PROGRAMS

[75] Inventor: Patrick Young, San Mateo, Calif.

[73] Assignee: Insight Telecast, Inc., Fremont, Calif.

[21] Appl. No.: 778,404

[22] Filed: Oct. 17, 1991

Related U.S. Application Data

[63] Continuation-in-part of Ser. No. 428,620, Oct. 30, 1989, abandoned.

[51] Int. Cl.⁵ .......................... H04N 7/18; H04N 5/44
[52] U.S. Cl. .................................. 358/194.1; 358/86; 359/142; 359/146
[58] Field of Search .............. 358/86, 181, 188, 191.1, 358/194.1, 337, 335; 455/4, 6, 3; 359/142, 145, 146, 147, 148

[56] References Cited

U.S. PATENT DOCUMENTS

| | | | |
|---|---|---|---|
| 4,375,651 | 3/1983 | Templin | 358/191.1 |
| 4,488,179 | 12/1984 | Kruger | 358/181 |
| 4,706,121 | 11/1987 | Young | 358/142 |
| 4,802,114 | 1/1989 | Sogame | 455/603 |
| 4,807,052 | 2/1989 | Amano | 358/194.1 |
| 4,841,368 | 6/1989 | Rumbolt | 358/194.1 |
| 4,908,713 | 3/1990 | Levine | 358/335 |

FOREIGN PATENT DOCUMENTS

| | | |
|---|---|---|
| 2338380 | 2/1975 | Fed. Rep. of Germany . |
| 1554411 | 10/1979 | United Kingdom . |
| 2126002 | 3/1984 | United Kingdom . |
| 7844 | 7/1990 | World Int. Prop. O. . |

OTHER PUBLICATIONS

Video Program System: Flexibel Programmieren Mit VPS, By Sommerhauser, Funkshau 25/1985 pp. 47 to 51.
TAC Timer, By Richard G. Merrell-Zenith Electronics Corporation 1986 NCTA Technical Paper, pp. 203 to 206.
Universal Remote Control-Owner's Manual, Radio Shack, 1987.
Zenith Corporation, undated material on Z-TAC received from Media General.

Primary Examiner—Tommy P. Chin
Attorney, Agent, or Firm—Flehr, Hohbach, Test, Albritton & Herbert

[57] ABSTRACT

A system (10) interfaces a cable televisions decoder (12) to a VCR (14) incorporating a television scheduling system. The cable signal is supplied to the cable decoder (12) on cable (16) and the decoded output of the decoder (12) is supplied to the VCR (14) through cable (18) on a fixed channel. The VCR (14) receives commands from its remote controller (20). A cable decoder remote control emulator (22) is connected at (23) between the VCR (14) and the cable decoder (12). All channel selection codes supplied to the VCR (14) by its remote controller (20) are converted by the remote control emulator (22) to command codes recognized by the cable decoder (12). The remote control emulator (22) also suppresses execution of the channel selection codes supplied to the VCR (14), in order to keep the VCR (14) tuned to the fixed channel on which the decoded cable signal is supplied. The remote control emulator (22) drives an infrared emitter, which is positioned in front of an infrared input on the cable decoder (12). Thus, the remote control emulator (22) replaces the conventional cable decoder remote controller. The user communicates with the system using the VCR remote controller (20). For the user, the system (10) appears to function in the same manner as would the VCR (14) connected to the TV (19) with no cable decoder (12) present.

32 Claims, 2 Drawing Sheets

SYSTEM AND METHOD FOR AUTOMATIC, UNATTENDED RECORDING OF CABLE TELEVISION PROGRAMS

ORIGIN OF THE APPLICATION

This application is a continuation in part of my earlier filed application Ser. No. 07/428,620, filed Oct. 30, 1989, now abandoned.

BACKGROUND OF THE INVENTION

1. Field of the Invention:

The present invention relates generally to a cable television (CATV) decoder interface. More particularly, it relates to such an interface for connecting the cable television decoder to a television accessory, such as a video cassette recorder (VCR). Most especially, it relates to such an interface which maintains full functionality of the television accessory while connected to the decoder.

2. Description of the Prior Art:

Cable television decoders typically operate by requiring a television set and a VCR connected to the decoder to be set to a predetermined channel, such as channel 2, 3 or 4, and all channel selection is accomplished by the decoder. This presents problems for unattended recording, in that not all of the advanced features available on state-of-the-art VCRs can be used while the VCR is under control of the decoder.

Two Zenith Electronics Corporation technical papers disclose systems which attempt to deal with this problem. Merrell, "Tac-Timer," 1986 NCTA Technical Papers, pp. 203-206, discloses a smart remote controller to solve the unattended programming problem when a cable decoder precedes a VCR. In lieu of programming the VCR, the smart remote controller is programmed to turn on a VCR at specific times to record desired programs. However, this remote controller does not coordinate channel selection for such devices as television schedule systems, such as disclosed in my U.S. Pat. No. 4,706,121, issued Nov. 10, 1987, nor does it support unique features of more advanced VCRs. For example, this controller does not support on-screen VCR programming, even if that feature is otherwise available on a VCR. The controller does not include any capability for conveying information about a channel selected on the cable decoder unit to a television schedule system or a VCR in any useful way.

Long, "The VCR Interface," 1986 NCTA Technical Papers, pp. 197-202, discloses two solutions for the unattended programming problem when a cable decoder precedes a VCR. The first of these is a VCR baseband decoder, also called BASE-TAC, and currently marketed by Zenith as MultiPort or MP. MPs allow the core functions (descrambling and addressing) of a cable decoder to be added to Tvs and VCRs. The decoder accepts the baseband output of the TV or VCR tuner, eliminating the need for a separate decoder tuner and attendant need to coordinate two tuners. This method is effective for supporting television schedule systems and allows full functionality of advanced VCR features. However, the MP alternative requires new TV or VCR equipment and is not compatible with the existing installed base of cable decoders. This method has not been well-received at this time. The second is the VCR Interface, which uses RF switching and a centralized approach for all TVs and VCRs in the home. It descrambles incoming CATV channels and, after modulation, combines them back onto the CATV cable at unused upper channels. The result is that any TV set on the cable can receive premium channels without a separate decoder. This method eliminates the need for redundant decoders at every TV set or VCR. As described, the system was conceived for only one premium channel. To support a television schedule system, all premium channels must be descrambled together and be available simultaneously. If not, it would be necessary to provide a way of tuning the centralized descrambler from any TV set or VCR attached to the cable. Such a scheme would be awkward when more than one TV or VCR competes for control of the single descrambler. The VCR interface may be implemented using retrofitted decoders, but the overall cost may be prohibitive for the average home.

A somewhat similar system for use with the German television networks is described in Sommerhauser, "Video Programm System: Flexibel programmieren mit VPS," Funkschau, No. 25, Dec. 1985, pp. 47-51.

Other prior art relating to CATV, its decoders, and programmable remote devices includes West German Published application no. 2,338,380, published Feb. 13, 1975; U.K. Pat. No. 1,554,411, published Oct. 17, 1979; U.S. Pat. No. 4,375,651, issued Mar. 1, 1983 to Templin et al.; U.S. Pat. No. 4,394,691, issued Jul. 19, 1983 to Amano et al; U.S. Pat. No. 4,802,114, issued Jan. 31, 1989 to Sogame. While the prior art relating to cable decoder interfaces and similar devices is a well-developed one, a need remains for further development of such devices. None of the existing interfaces both provides a complete solution to the problem of unattended recording and is compatible with already installed equipment.

SUMMARY OF THE INVENTION

Accordingly, it is an object of this invention to provide a single tuning arrangement which will coordinate channel selection information between a cable decoder and a television schedule system, a VCR or any television device.

It is another object of the invention to provide such a tuning arrangement which is compatible with already installed equipment.

It is a further object of the invention to provide such a single tuning arrangement which preserves the advanced features of television devices when operating behind cable decoders.

The attainment of these and related objects may be achieved through use of the novel system and method to allow automatic, unattended recording of cable television programs supplied on a cable system herein disclosed. A video recording system to allow automatic, unattended recording of at least two cable television programs supplied sequentially at different times on different channels of a cable system includes a television receiver, a remote controllable cable decoder and a remote controllable video recorder with unattended programming capability connected between the television receiver and the cable decoder. A remote controller for the video recorder includes a means for user input of program selections from a television schedule. The remote controller is coupled to the video recorder. A channel selection coordinator includes a memory means for storing channel tuning conversion information and program selections input by the user with the means for user input of program selections. A means converts channels of the at least two program selections to channel tuning commands recognizable by the cable decoder using the channel tuning conversion information and the program selections. A means automatically transmits the channel tuning commands to the cable decoder at broadcast times of the at least two program selections. A means automatically supplies recording commands to the video recorder at the broadcast times of the at least two program selections.

The method of this invention automatically records cable television programs supplied sequentially at different times on a cable system unattended, even with channel changes between the programs. A remote controllable video recorder having unattended programming capability is connected between a television receiver and a remote controllable cable decoder. Channel tuning conversion information is stored in a memory. Program selections for at least two programs on different channels is input from a television schedule with a remote controller for the video recorder. The program selections are stored in the memory. Channels of the program selections are converted to channel tuning commands recognizable by the cable decoder using the channel tuning conversion information and the program selections. The channel tuning commands are automatically transmitted to the cable decoder at broadcast times of the program selections. Recording commands are automatically transmitted to the video recorder at the broadcast times of the program selections.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
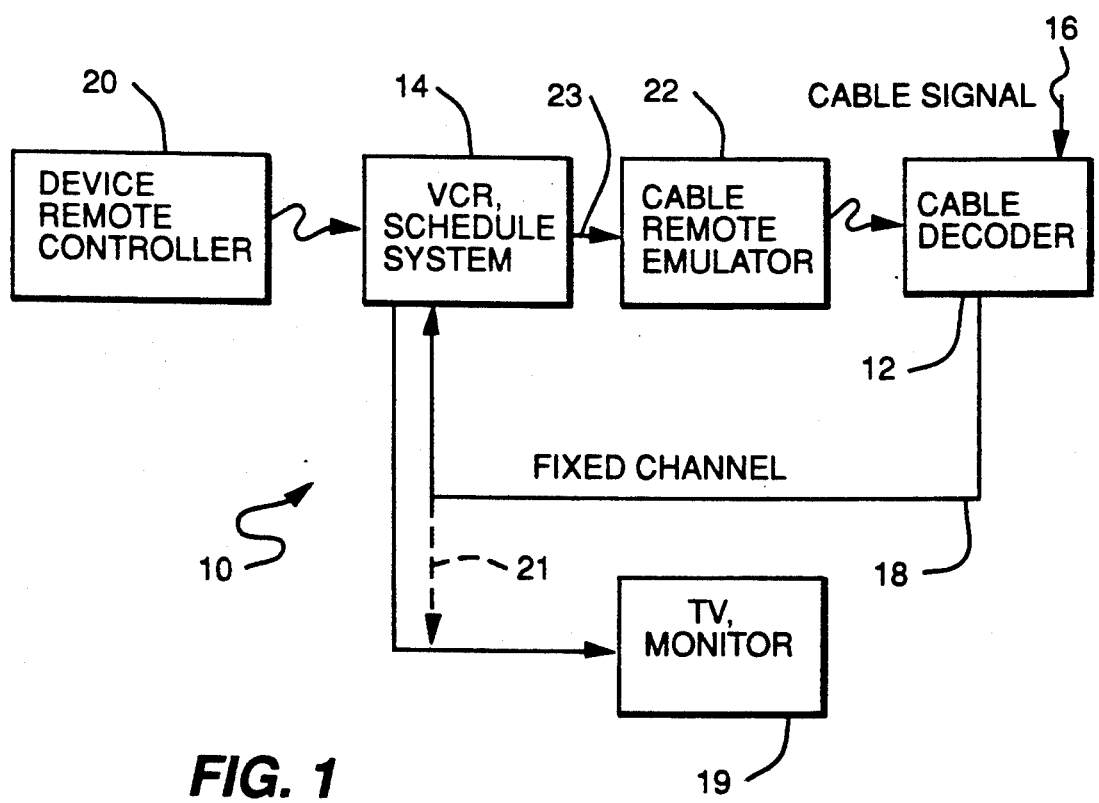
FIG. 1 is a block diagram of a system for interfacing a cable television decoder to a television accessory in accordance with the invention.

Turning now to the drawings, more particularly to FIG. 1, there is shown a system 10 for interfacing a cable television decoder 12 to a VCR 14 incorporating a television scheduling system of the type disclosed in my above-referenced issued U.S. Pat. No. 4,706,121. As is conventional, the cable signal is supplied to the cable decoder 12 on cable 16, and the decoded output of the decoder 12 is supplied to the VCR 14 through cable 18 on a fixed channel. The decoded output on the fixed channel is also selectively supplied to a television set 19, as indicated at 21. The VCR 14 receives commands from its remote controller 20. A cable decoder remote control emulator 22 is connected at 23 between the VCR 14 and the cable decoder 12. All channel selection codes supplied to the VCR 14 by its remote controller 20 are converted by the remote control emulator 22 to command codes recognized by the cable decoder 12. The remote control emulator 22 also suppresses execution of the channel selection codes supplied to the VCR 14, in order to keep the VCR 14 tuned to the fixed channel on which the decoded cable signal is supplied.

Figure 2:
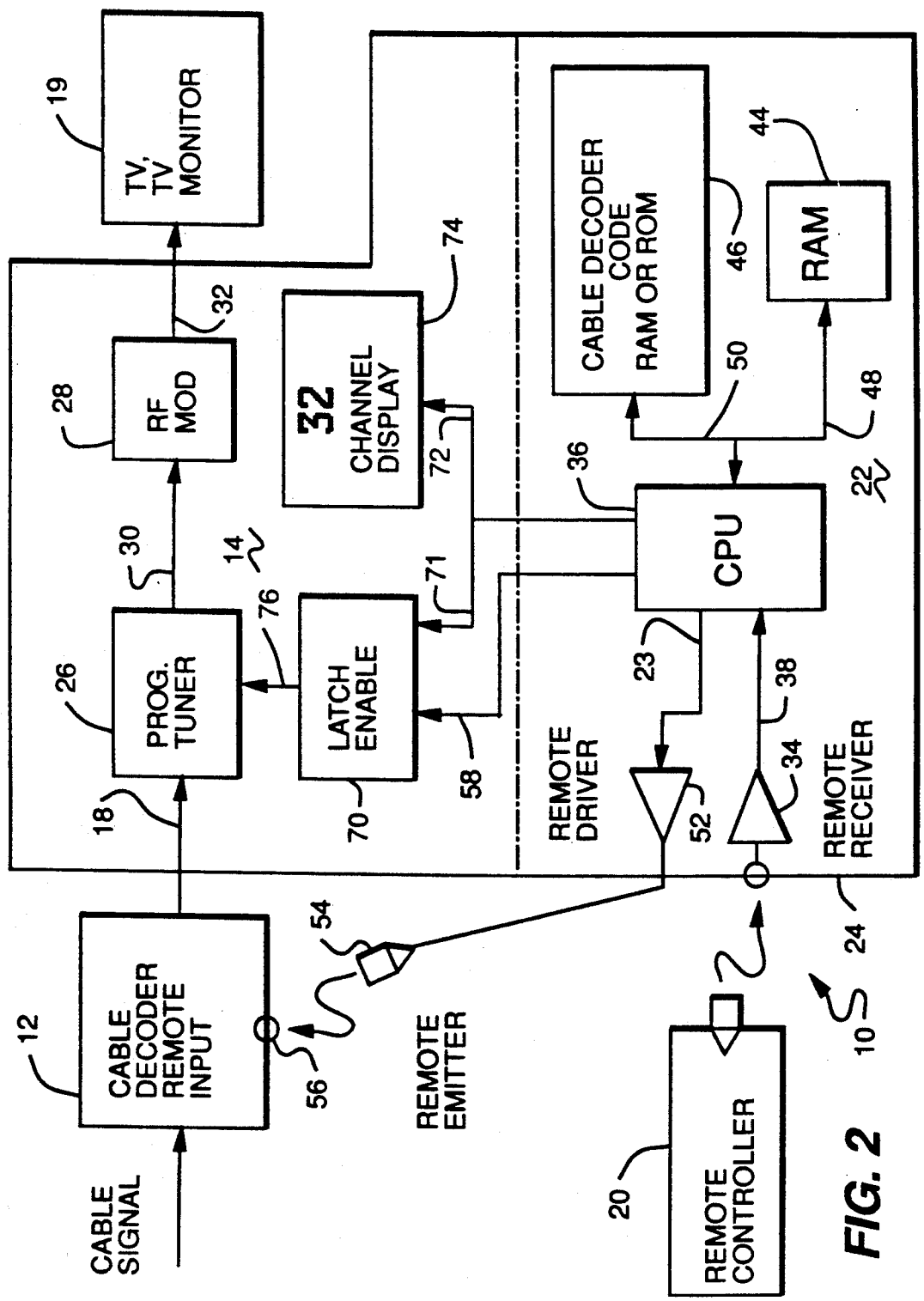
FIG. 2 is a more detailed block diagram of the system shown in FIG. 1.

When the cable decoder mode is selected, channel indicator 74 (FIG. 2) of the VCR will show the channel selected by the cable decoder unit. There are two reasons for using the VCR 14 to display the channel number instead of the cable decoder 12: The cable unit may now be hidden from sight, which is desired by most users, and it provides improved infrared isolation of the VCR remote controller 20 signal from unwanted pickup by the cable decoder remote input 56 (FIG. 2). The benefit of using the VCR 14 for channel display is that the cable decoder unit 12 can be made transparent to the user.

The remote control emulator 22 drives an infrared emitter, which is positioned in front of an infrared input on the cable decoder 12. Thus, the remote control emulator 22 replaces the conventional cable decoder remote controller. The user communicates with the system using the VCR remote controller 20. For the user, the system 10 appears to function in the same manner as would the VCR 14 connected to the TV 19 with no cable decoder 12 present. This means that all functions, including on screen programming and the TV schedule system, provided with the VCR 14 are fully functional and are operated uniformly by the user and interact with the user uniformly.

Further details of portions of the VCR 14 and the cable remote emulator 22 are provided in FIG. 2. As indicated at 24, the remote emulator 22 is supplied together with the VCR 14. The VCR 14 includes a programmable tuner 26 connected to an RF modulator 28 by cable 30. The cable decoder 12 is connected to the programmable tuner 26 by the cable 18, and the RF modulator 28 is connected to the TV 19 by cable 32. The remote controller 20 supplies its inputs to a remote receiver 34 in the cable remote emulator 22. The remote receiver 34 is connected to a central processing unit (CPU) 36 by line 38. The CPU 36 is implemented with a commercially available microprocessor integrated circuit, such as those available from Intel Corporation, Santa Clara, Calif. or Motorola, Inc., Phoenix, Ariz. The CPU 36 is connected to a random access memory 44 and to a cable decoder code memory 46, which may be either a random access or a read only memory, by busses 48 and 50. The CPU 36 is connected to a remote driver circuit 52 by the line 23. The remote driver circuit 52 is connected to an infrared emitter 54, which is positioned in front of remote input 56 of the cable decoder 12. The CPU 36 is connected to the programmable tuner 26 through a latch 70 by lines 71 and 76 and to a channel display 74 by line 72. The latch 70 is also connected to the CPU 36 by line 58. The latch 70 allows the channel data to be shown on the display 74 to be separated from data which is supplied to the programmable tuner 26. Data is supplied to the programmable tuner 26 only when the latch is enabled on line 58.

In operation, the cable remote emulator 22 is either programmed to learn the cable decoder 12 remote controller codes in the conventional manner for teaching a remote controller to learn the commands of a foreign controller, which are then stored in the cable decoder code memory 46, or the memory 46 contains conversion codes stored in ROM for the more popular cable decoder 12 models. The TV schedule system, which also utilizes the CPU 36, is set to the cable mode by a command from the remote controller 20. This causes the programmable tuner 26, also forming part of the TV schedule system, to be non-responsive to the remote controller 20 channel commands, as a result of a suitable control signal on line 58, so that the tuner will remain tuned to the fixed channel for the cable decoder 12, typically channel 3 or 4. However, the channel commands are stored in memory 44. Whenever the TV schedule system requires channel information, it will refer to the stored channel information. For example, when the TV schedule system is opened, it will point to the channel currently being viewed/recorded. When a program is selected from the TV schedule system, the system will automatically generate codes recognizable by the cable decoder 12 to change the channel on the cable decoder 12. When a cable input is not being used, the latch 70 is enabled on line 58, so that channel commands on line 71 are supplied to the programmable tuner 26.

Remote controller 20 commands are infrared coupled to the CPU 36 and stored in memory 44. When the system 10 includes a cable decoder 12, all channel tuning commands from the remote controller 20 are inhibited in favor of cable decoder channel commands recognized by the cable decoder and produced by the CPU 36 through conversion from the channel tuning commands. The conversion code is contained in a ROM, or a RAM if the system 10 has a "learn" mode. After a delay to prevent potential conflict of two infrared signals, the converted code is coupled to the cable decoder remote input 56 by the infrared emitter 54. The process of emulating codes recognizable by the cable decoder 12 is done in a conventional manner known in the art. All other commands from the remote controller 20 are acted upon in the system 10 unchanged.

It should now be apparent to those skilled in the art that a novel system for interfacing a cable television decoder to a television accessory capable of achieving the stated objects of the invention has been provided. The system and method provides a single tuning arrangement which will coordinate channel selection information between a cable decoder and a television schedule system, a VCR or any television device. The tuning arrangement is compatible with already installed equipment. The single tuning arrangement preserves the advanced features of television devices when operating behind cable decoders.

It should further be apparent to those skilled in the art that various changes in form and details of the invention as shown and described may be made. It is intended that such changes be included within the spirit and scope of the claims appended hereto.

What is claimed is:

1. A video recording system to allow automatic, unattended recording of cable television programs supplied sequentially at different times on different channels of a cable system, comprising a television receiver, a remote controllable cable decoder and a remote controllable video recorder with unattended programming capability connected between said television receiver and said remote controllable cable decoder, a remote controller for said remote controllable video recorder coupled to said remote controllable video recorder, said remote controller including means for transmitting program selections from a television schedule to said remote controllable video recorder, said remote controllable video recorder including a channel selection coordinator, said channel selection coordinator including a memory means for storing channel tuning conversion information and program selections transmitted to said remote controllable video recorder by said remote controller, a means for converting channels of the program selections to channel tuning commands recognizable by said remote controllable cable decoder using the channel tuning conversion information and the program selections, a means for automatically transmitting the channel tuning commands to said remote controllable cable decoder at broadcast times of the program selections, and a means for automatically supplying recording commands to said remote controllable video recorder at the broadcast times of the program selections.

2. The video recording system of claim 1 in which said means for automatically transmitting the channel tuning commands to said remote controllable cable decoder and said means for automatically supplying recording commands to said remote controllable video recorder comprises a microprocessor.

3. The video recording system of claim 2 in which said remote controllable video recorder has a channel indicator, said microprocessor is connected to said channel indicator, and said microprocessor is configured to display a channel on said channel indicator corresponding to the channel tuning command transmitted to said remote controllable cable decoder.

4. The video recording system of claim 2 in which said microprocessor is connected and configured to keep said remote controllable video recorder tuned to a fixed channel different than a channel corresponding to the channel tuning commands transmitted to said remote controllable cable decoder.

5. The video recording system of claim 1 in which the television schedule is a broadcast television schedule and said video recording system includes a means for receiving the broadcast television schedule.

6. The video recording system of claim 5 in which said means for receiving the broadcast television schedule is part of said remote controllable video recorder.

7. The video recording system of claim 1 in which said remote controllable video recorder is a videocassette recorder.

8. The video recording system of claim 1 in which said means for transmitting program selections to said remote controllable video recorder comprises a first infrared transmitter positioned to direct the program selections to said remote controllable video recorder.

9. The video recording system of claim 8 in which said means for automatically transmitting the channel tuning commands comprises a second infrared transmitter positioned to direct the channel tuning commands to said remote controllable cable decoder.

10. A video recording system to allow automatic, unattended recording of at least two cable television programs supplied sequentially at different times on different channels of a cable system, comprising a television receiver, a remote controllable cable decoder and a remote controllable video recorder with unattended programming capability connected between said television receiver and said remote controllable cable decoder, a channel selection coordinator, said channel selection coordinator including a means for user input of cable television program selections from a cable television schedule, a memory means for storing channel tuning conversion information and cable television program selections input by the user with said means for user input of cable television program selections, a means for converting channels of the at least two cable television program selections to channel tuning commands recognizable by said remote controllable cable decoder using the channel tuning conversion information and the at least two cable television program selections, a means, coupled to said remote controllable cable decoder, for automatically transmitting the channel tuning commands to said remote controllable cable decoder at broadcast times of the at least two cable television program selections, and a means, coupled to said remote controllable video recorder for automatically supplying recording commands to said remote controllable video recorder at the broadcast times of the at least two cable television program selections.

11. The video recording system of claim 10 in which said means for automatically transmitting the channel tuning commands to said remote controllable cable decoder and said means for automatically supplying recording commands to said remote controllable video recorder comprise a microprocessor.

12. The video recording system of claim 11 in which said remote controllable video recorder has a channel indicator, said microprocessor is coupled to said channel indicator, and said microprocessor is configured to display a channel on said channel indicator corresponding to the channel tuning commands transmitted to said remote controllable cable decoder.

13. The video recording system of claim 11 in which said microprocessor is coupled and configured to keep said remote controllable video recorder tuned to a fixed channel different than channels corresponding to the channel tuning commands transmitted to said remote controllable cable decoder.

14. The video recording system of claim 10 in which the television schedule is a broadcast television schedule and said video recording system includes a means for receiving the broadcast television schedule.

15. The video recording system of claim 14 in which said means for receiving the broadcast television schedule is part of said remote controllable video recorder.

16. The video recording system of claim 10 in which said remote controllable video recorder is a videocassette recorder.

17. The video recording system of claim 10 in which said means for user input of cable television program selections to said channel selection coordinator comprises a first infrared transmitter positioned to direct the program selections to said channel selection coordinator.

18. The video recording system of claim 17 in which said means for automatically transmitting the channel tuning commands comprises a second infrared transmitter positioned to direct the channel tuning commands to said remote controllable cable decoder.

19. A method for automatic, unattended recording of cable television programs supplied sequentially at different times on different channels of a cable system with a remote controllable video recorder having unattended programming capability connected between a remote controllable cable decoder and a television receiver, which method for automatic, unattended recording of cable television programs comprises storing channel tuning conversion information in a memory of the remote controllable video recorder, transmitting cable television program selections from a television schedule to the remote controllable video recorder with a remote controller for the remote controllable video recorder, storing the cable television program selections transmitted to the remote controllable video recorder by the remote controller in the memory of the remote controllable video recorder, converting channels of the cable television program selections to channel tuning commands recognizable by the remote controllable cable decoder using the channel tuning conversion information and the cable television program selections, automatically transmitting the channel tuning commands from the remote controllable video recorder to the remote controllable cable decoder at times of the cable television program selections, and automatically supplying recording commands to recording portions of the remote controllable video recorder at the times of the cable television program selections.

20. The method of claim 19 in which the remote controllable video recorder has a channel indicator, the method additionally comprising displaying channels on the channel indicator corresponding to the channel tuning commands transmitted to the remote controllable cable decoder.

21. The method of claim 19 additionally comprising keeping the remote controllable video recorder tuned to a fixed channel different than channels corresponding to the channel tuning commands transmitted to the remote controllable cable decoder.

22. The method of claim 19 in which the television schedule is broadcast and the method includes receiving the broadcast television schedule.

23. The method of claim 22 in which the broadcast television schedule is received by the remote controllable video recorder.

24. The method of claim 19 in which the program selections are transmitted to the remote controllable video recorder by a first infrared transmitter positioned to direct the program selections to the remote controllable video recorder.

25. The method of claim 24 in which the channel tuning commands are transmitted to the remote controllable cable decoder by a second infrared transmitter positioned to direct the channel tuning commands to the remote controllable cable decoder.

26. A method for automatic, unattended recording of at least two cable television programs supplied sequentially at different times on different channels of a cable system with a remote controllable video recorder having unattended programming capability connected between a television receiver and a remote controllable cable decoder, which comprises storing channel tuning conversion information in a first memory location of a channel selection coordinator, inputting program selections for the at least two cable television programs from a television schedule to the channel selection coordinator, storing the program selections in a second memory location of the channel selection coordinator, converting channels of the program selections to channel tuning commands recognizable by the remote controllable cable decoder using the channel tuning conversion information and the program selections, automatically transmitting the channel tuning commands to the remote controllable cable decoder at broadcast times of the program selections, and automatically supplying recording commands to the remote controllable video recorder at the broadcast times of the program selections.

27. The method claim 26 in which the remote controllable video recorder has a channel indicator, the method additionally comprising displaying channels on the channel indicator corresponding to the channel tuning commands transmitted to the remote controllable cable decoder.

28. The method of claim 26 additionally comprising keeping the remote controllable video recorder tuned to a fixed channel different than channels corresponding to the channel tuning commands transmitted to the remote controllable cable decoder.

29. The method of claim 26 additionally comprising broadcasting the television schedule and receiving the broadcast television schedule.

30. The method of claim 29 in which the broadcast television schedule is received by the remote controllable video recorder.

31. The method of claim 26 in which the program selections are transmitted to the channel selection coordinator by a first infrared transmitter positioned to direct the program selections to the channel selection coordinator.

32. The method of claim 31 in which the channel tuning commands are transmitted by a second infrared transmitter positioned to direct the channel tuning commands to the remote controllable cable decoder.

* * * * *